United States Patent [19]

Tajima et al.

[11] 4,225,654
[45] Sep. 30, 1980

[54] FUEL CELL

[75] Inventors: Hiroyuki Tajima; Tetsuo Arai, both of Kawasaki, Japan

[73] Assignee: Fuji Electric Co., Ltd., Tokyo, Japan

[21] Appl. No.: 36,610

[22] Filed: May 7, 1979

[30] Foreign Application Priority Data

May 10, 1978 [JP] Japan .................................. 53-55218

[51] Int. Cl.³ .............................................. H01M 8/24
[52] U.S. Cl. ...................................... 429/34; 429/154
[58] Field of Search ..................... 429/12, 34, 35, 36, 429/37, 38, 39, 152, 153, 154

[56] References Cited

U.S. PATENT DOCUMENTS 3,880,670  4/1975  Shinn ..................................... 429/38

FOREIGN PATENT DOCUMENTS 966407  8/1964  United Kingdom ...................... 429/34

Primary Examiner—Donald L. Walton
Attorney, Agent, or Firm—Bruce L. Birchard

[57] ABSTRACT

By utilizing in a multi-layered fuel cell, plastic separators with the inter-cell connectors supported in resilient but vaportight fashion within the separators, a lighweight fuel cell may be realized which does not suffer from fuel-oxidizer leakage despite temperature rises and accompanying differential component expansion.

10 Claims, 5 Drawing Figures

FUEL CELL

BACKGROUND OF THE INVENTION

1. Field of the Invention

This invention related to the field of primary batteries and, more specifically, to improved, lightweight fuel cells.

2. Description of the Prior Art

Fuel cells utilizing, for example, hydrogen and oxygen to create electricity are well known. The terminal potential of such a cell approximates only one volt and the current generating capacity is limited to several hundred milliamperes per square centimeter of electrode area. Thus, for practical use, it is necessary to connect multiple cells in series and parallel.

Such multi-layered cells, in the past, have utilized metallic plates, usually nickel, as separators between successive cells. Appropriate finger or other contacts were provided on the plates to inter-connect successive cell electrodes to provide series combination of the individual cells. Such construction suffered from excessive weight, which is undesirable in airborne or satellite operations, and from corrosion of the nickel separators. Further, with the temperature rise associated with fuel cell operation, differential expansion of the electrodes, separators and separator fingers resulted in increased electrical resistance within the layered cell and decreased overall performance for the battery.

The use of plastic separators has been suggested. In such construction graphite-impregnated connectors are molded integrally with the separators and extend through the separators to make electrical contact (when installed in a layered fuel-cell) between the anode of one cell and the cathode of the succeeding cell. It is necessary that such connectors be supported in vapor-sealed fashion within the separators so as to prevent undesired inter-leakage between the fuel and oxidizer compartments of successive cells. Regrettably, because of the significant difference in the coefficients of thermal expansion between such plastics as polyurethane, which might be used for the separators, and graphite with which the connectors are thoroughly impregnated, during the temperature rise normally associated with fuel cell operation, vapor leaking may occur where the connectors are supported in the separators and, further, contact between the conductors and successive fuel cell electrodes may show increased resistance, resulting in decreased battery performance.

Therefore, it is an object of this invention to eliminate the various problems set forth hereinbefore.

It is a further object of this invention to provide an improved layered fuel cell construction which is lightweight and easy to assemble.

It is an additional object of this invention to provide a layered fuel cell which shows high performance at elevated operating temperatures.

SUMMARY OF THE INVENTION

Stated succinctly by supporting inter-cell conductors in the separators by utilizing elastic, vapor-tight seals made from synthetic rubber or other elastic material, a light-weight, gas-tight, high efficiency, low-cost layered fuel cell can be realized.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description taken in conjunction with the accompanying drawings, in which:

DESCRIPTON OF THE PREFERRED EMBODIMENTS

Figure 1:
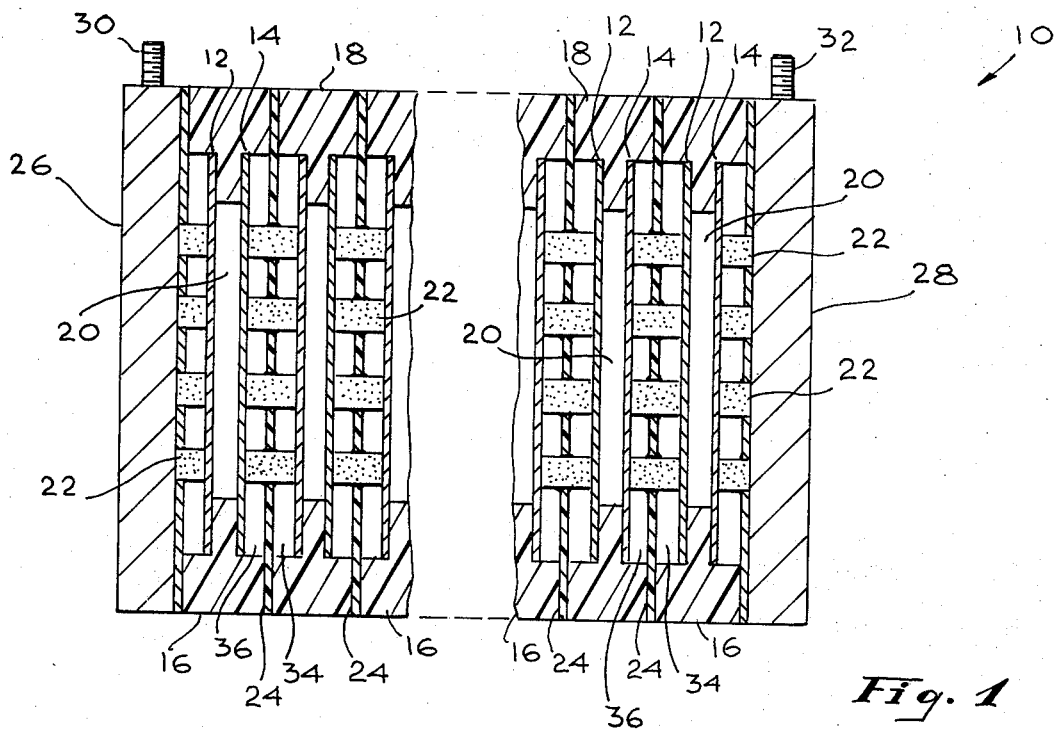
FIG. 1 is a cut-away, elevational view of a layered fuel cell incorporating certain aspects of the present invention.

In FIG. 1 layered fuel cell 10 includes anodes 12 and cathodes 14 separated by insulators 16 and 18 to form cavities 20 which carry an electrolytic solution of either an alkaline or an acid nature. Conductors 22 are carbonaceous in character, being bound carbon particles forming conductor bars or graphite impregnated plastic exhibiting good electrical conductivity. It should be noted that carbon is relatively inert in the fuel cell environment, assuring long life for the battery. Conductors 22 are carried in separators 24, as can be seen more clearly in FIG. 2, and assure electrical connection between successive fuel cells in battery 10 and with pressure plates 26 and 28 which, if conductive, may carry terminals 30 and 32, respectively, thereon. Separators 24 are of polyurethane, epoxy or any similar resin which may be easily cast or molded. Such plastics exhibit good resistance to the oxidizer and gaseous fuel utilized in fuel cells.

Fuel, such as hydrogen or methane, is passed through the chambers 34 formed between separators 24 and anodes 12. An oxidizer, such as oxygen or air is passed through the chambers 36 formed between separators 24 and cathodes 14.

Figure 2:
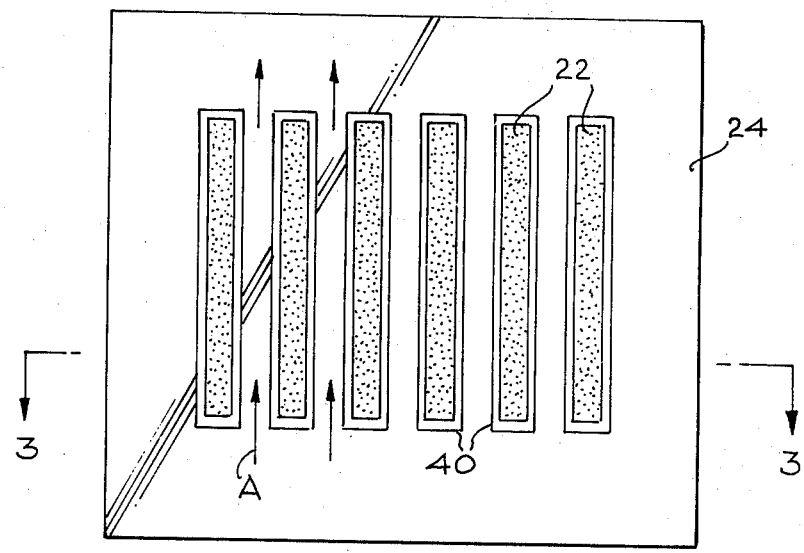
FIG. 2 is an elevational view of one separator-conductor combination from FIG. 1 rotated 90° in the plane of the paper.

The flow of gas A is shown in FIG. 2 to be parallel to conductors 22 in each separator 24. Conductors 22 are secured, gas-tight, in separators 24 by means of elastic plastic material 40, which can be seen more clearly in FIG. 3.

Figure 3:
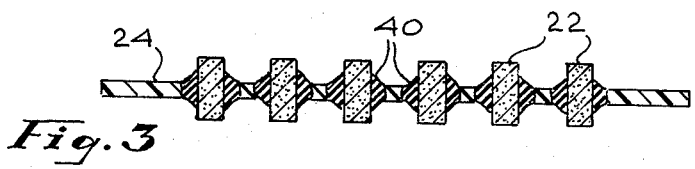
FIG. 3 is one possible sectional view taken along the line 3—3 in FIG. 2.

In FIG. 3, conductors 22 are shown suspended, in gas-tight fashion, in separator 24 by means of elastic material 40, which may be of any synthetic rubber, such as ethylene-propylene rubber, butyl rubber or neoprene. Thus, when the internal temperature of layered cell or battery 10 rises, any distortions of electrodes 12 or 14 or of separators 24 can be accommodated by the resilient seal 40, thus preventing leakage of either fuel or oxidizer into undesired areas and also keep good electrical contact between adjacent cells.

Figure 4:
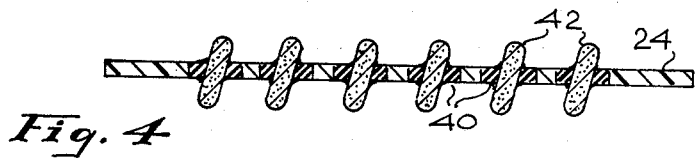
FIG. 4 is an alternative sectional view taken along line 3—3 in FIG. 2.
Figure 5:
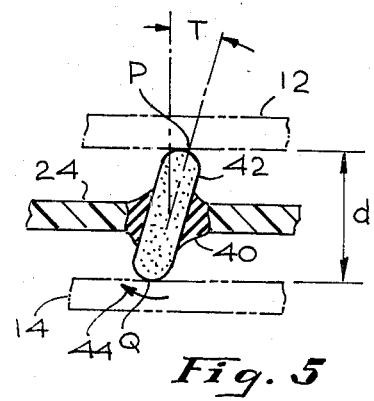
FIG. 5 is a schematic representation of certain relationships of the elements in FIG. 4.

Additional distortions can be accommodated by the structure shown in FIGS. 4 and 5. In FIGS. 4 and 5 conductors 42 are suspended, by elastic material 40, at an angle T in separators 24. Further, conductors 42 may have rounded contact edges, as shown so that, despite changes in the distance "d", conductor 42 remains in firm contact with cathode 14 and anode 12 at tangent points Q and P, respectively. Because of the elasticity of seal 40, conductor 42 may rotate in the direction shown by arrow 44 as the distance "d" decreases between cathode 14 and anode 12. This rotation keeps good electrical contact between successive cells in the battery of fuel cells, despite structural changes arising from changes in the internal temperature of the multi-layered fuel cell. Because seal 40 is impermeable to fuel or oxidizer the respective chambers remain isolated from each other.

While particular embodiments of the present invention have been shown and described, it is understood by those skilled in the art that alterations or modifications may be made without departing from the spirit or scope of this invention. It is the purpose of the appended claims to cover all such alterations and modifications.

What is claimed is:

1. A multi-layered fuel cell including: a plurality of adjacent unitary cells each including an anode and a cathode;
   a plastic, gas-impermeable separator physically separating the anode electrode of one of said plurality of cells from the cathode electrode of the adjacent cell in said plurality;
   a plurality of conductors extending through said separator and flexibly supported therein by elastic, gas-tight seals;
   said conductors interconnecting, electrically, said anode electrode of one of said unitary cells to said cathode electrode of the next succeeding cell in said plurality;
   a chamber for electrolyte formed, at least in part, by the anode and cathode electrodes of each unitary cell;
   housing means for supporting said unitary cells in fixed relationship with respect to each other;
   means for introducing fuel and oxidizer gases to said unitary cells; and,
   means for extracting electricity from said plurality of unitary cells.

2. Apparatus according to claim 1 in which said conductors are of carbon.

3. Apparatus according to claim 1 in which said seals are of synthetic rubber.

4. Apparatus according to claim 1 in which said separators are of polyurethane.

5. Apparatus according to claim 1 in which said conductors are tilted with respect to the plane of said separator.

6. Apparatus according to claim 5 in which said conductors have rounded edges for contacting said anode and cathode electrodes in successive unitary cells.

7. Apparatus according to claim 1 in which said conductors are formed of carbon-impregnated plastic.

8. Apparatus according to claim 3 in which said synthetic rubber is butyl rubber.

9. Apparatus according to claim 1 in which said means for extracting electricity includes conductive end plates carried by said housing means.

10. Apparatus according to claim 1 in which said housing means includes insulators separating the anode and cathode electrodes of each unitary cell.

* * * * *